United States Patent
Kusafuka et al.

(10) Patent No.: US 12,388,970 B2
(45) Date of Patent: Aug. 12, 2025

(54) METHOD FOR SETTING THREE-DIMENSIONAL IMAGE DISPLAY SYSTEM

(71) Applicant: KYOCERA Corporation, Kyoto (JP)

(72) Inventors: Kaoru Kusafuka, Kyoto (JP); Akinori Satou, Otsu (JP); Ayuki Hayashishita, Yasu (JP)

(73) Assignee: KYOCERA Corporation, Kyoto (JP)

( * ) Notice: Subject to any disclaimer, the term of this patent is extended or adjusted under 35 U.S.C. 154(b) by 91 days.

(21) Appl. No.: 18/564,555

(22) PCT Filed: May 27, 2022

(86) PCT No.: PCT/JP2022/021842
§ 371 (c)(1),
(2) Date: Nov. 27, 2023

(87) PCT Pub. No.: WO2022/250164
PCT Pub. Date: Dec. 1, 2022

(65) Prior Publication Data
US 2024/0259547 A1    Aug. 1, 2024

(30) Foreign Application Priority Data
May 28, 2021    (JP) .................. 2021-090548

(51) Int. Cl.
*H04N 13/327*    (2018.01)
*H04N 13/302*    (2018.01)
*H04N 13/383*    (2018.01)
*H04N 13/398*    (2018.01)

(52) U.S. Cl.
CPC ......... *H04N 13/327* (2018.05); *H04N 13/302* (2018.05); *H04N 13/383* (2018.05); *H04N 13/398* (2018.05)

(58) Field of Classification Search
CPC .. H04N 13/327; H04N 13/302; H04N 13/383; H04N 13/398; H04N 13/363; H04N 13/312; H04N 13/346; H04N 13/366
USPC ............................................................. 348/54
See application file for complete search history.

(56) References Cited

U.S. PATENT DOCUMENTS

| | | | |
|---|---|---|---|
| 10,996,472 B2* | 5/2021 | Beckman ............... | H04N 23/55 |
| 2009/0115586 A1* | 5/2009 | Lvovskiy ............... | G02B 27/01 |
| | | | 340/438 |
| 2015/0177591 A1* | 6/2015 | Sugiyama .......... | G02B 27/0093 |
| | | | 359/298 |
| 2016/0209647 A1* | 7/2016 | Fürsich ............. | G02B 27/0075 |

(Continued)

*Primary Examiner* — Tung T Vo
(74) *Attorney, Agent, or Firm* — Procopio, Cory, Hargreaves & Savitch LLP

(57) ABSTRACT

A second controller causes a display panel to sequentially display a plurality of test images, and causes a second camera in an external camera to sequentially capture the plurality of test images to obtain a plurality of second images. The captured second images are transmitted from the external camera to a three-dimensional image display system. The three-dimensional image display system extracts luminance from the received second images and creates luminance plots based on the extracted luminance. A third controller calculates phase values based on the created luminance plots. The third controller stores the calculated phase values with corresponding coordinates on the display panel into a storage as a phase distribution.

7 Claims, 13 Drawing Sheets

(56) References Cited

U.S. PATENT DOCUMENTS

| | | | | |
|---|---|---|---|---|
| 2016/0291330 A1* | 10/2016 | Kurokawa | .......... | G02B 27/0179 |
| 2018/0041699 A1* | 2/2018 | Tohara | ................ | H04N 13/344 |
| 2018/0264940 A1* | 9/2018 | Torii | ...................... | G08G 1/166 |
| 2019/0271840 A1* | 9/2019 | Kishigami | ............ | B60K 35/233 |
| 2020/0201037 A1* | 6/2020 | Yamamoto | .............. | B60K 35/00 |
| 2021/0107356 A1* | 4/2021 | Watanabe | .............. | B60K 35/81 |
| 2021/0152812 A1* | 5/2021 | Ota | ..................... | G02B 27/0179 |
| 2021/0364810 A1* | 11/2021 | Kim | .................... | G02B 27/0101 |
| 2022/0091415 A1* | 3/2022 | Misawa | .................. | A61B 5/163 |
| 2023/0066670 A1* | 3/2023 | Yasuda | ................. | G08B 21/06 |
| 2024/0001761 A1* | 1/2024 | Dehkordi | ............... | B60K 35/00 |
| 2024/0061240 A1* | 2/2024 | Hirata | ..................... | B60R 11/02 |
| 2024/0126095 A1* | 4/2024 | Shintani | .................... | B60R 1/29 |
| 2024/0198908 A1* | 6/2024 | Shintani | ............... | H04N 9/3188 |
| 2024/0253465 A1* | 8/2024 | Shintani | ............... | H04N 13/363 |

\* cited by examiner

FIG. 4A

| 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 |
|---|---|---|---|---|---|---|---|---|---|---|---|---|---|---|---|---|---|---|---|---|---|---|---|
| 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 |
| 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 |
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 |
| 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 |

| 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 |
|---|---|---|---|---|---|---|---|---|---|---|---|---|---|---|---|---|---|---|---|---|---|---|---|
| 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 |
| 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 |
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 |
| 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 |

21

←—→ 201L

—20

| 7.22469 | 6.64602 | 6.05147 | 5.48956 | 5.02022 | 4.63556 | 4.30861 |
| --- | --- | --- | --- | --- | --- | --- |
| 7.07765 | 6.52954 | 5.94729 | 5.40409 | 4.94797 | 4.5575 | 4.24749 |
| 6.95069 | 6.42 | 5.84898 | 5.3229 | 4.87217 | 4.48972 | 4.18004 |
| 6.83212 | 6.31711 | 5.76945 | 5.26377 | 4.81689 | 4.43788 | 4.13313 |
| 6.73616 | 6.23467 | 5.71094 | 5.20725 | 4.76025 | 4.39016 | 4.10083 |

METHOD FOR SETTING THREE-DIMENSIONAL IMAGE DISPLAY SYSTEM

TECHNICAL FIELD

The present disclosure relates to a method for setting a three-dimensional (3D) image display system.

SUMMARY

In one embodiment of the present disclosure, a method is for setting a three-dimensional image display system. The three-dimensional image display system includes a display panel that displays a parallax image including a right-eye image and a left-eye image, an optical panel that defines a traveling direction of light for each of the right-eye image and the left-eye image, a reflective plate that reflects the right-eye image and the left-eye image with the traveling direction of light being defined, a first camera that captures a first image including an image of an area expected to include a face of a user of the three-dimensional image display system, a first controller that detects a position of at least one of eyes of the user as a first position based on the first image, a second controller that generates the parallax image including the right-eye image and the left-eye image based on a first distribution of a first parameter and the first position, a third controller that calculates a second distribution of the first parameter, and a first communicator that communicates with an external device. The external device includes an external camera including a second camera that captures a second image and a second communicator that communicates directly or indirectly with the first communicator. The method includes moving the second camera to a position to allow the parallax image reflected from the reflective plate to be captured, detecting the position of the second camera as a second position based on the first image, sequentially displaying a plurality of test images on the display panel, and sequentially capturing the plurality of test images reflected from the reflective plate with the second camera to obtain a plurality of second images, calculating the second distribution based on the plurality of second images and the second position, and replacing the first distribution with the calculated second distribution.

BRIEF DESCRIPTION OF THE DRAWINGS

FIG. 4A is a schematic front view of the display panel.

FIG. 4B is a diagram of left-eye viewing areas.

DESCRIPTION OF EMBODIMENTS

The objects, features, and advantages of the present disclosure will become more apparent from the following detailed description and the drawings.

As the structure that forms the basis of the present disclosure, a known three-dimensional (3D) image display system directs a part of image light from a display panel to reach the right eye of a user and directs another part of the image light to reach the left eye of the user to generate parallax between the two eyes of the user to cause the user to view a 3D image.

Image light from the display panel travels in the direction defined by, for example, an optical panel, and reaches the right eye or the left eye of the user. The image light from the display panel may also indirectly reach the eyes of the user with, for example, a reflective plate.

During assembly or installation of the 3D image display system, the optical panel or the reflective plate may have any positional deviation. Although no such positional deviation occurs during assembly or installation or such a positional deviation is negligible in viewing a 3D image, the optical panel or the reflective plate may positionally deviate over time or may deform after use of the 3D image display system. Such positional deviation or deformation may prevent the user from properly viewing a 3D image.

One or more aspects of the present disclosure are directed to a method for setting a 3D image display system that allows a user to properly view a 3D image.

One or more embodiments of the present disclosure will now be described in detail with reference to the drawings. The drawings used herein are schematic and are not drawn to scale relative to the actual size of each component.

Figure 1:
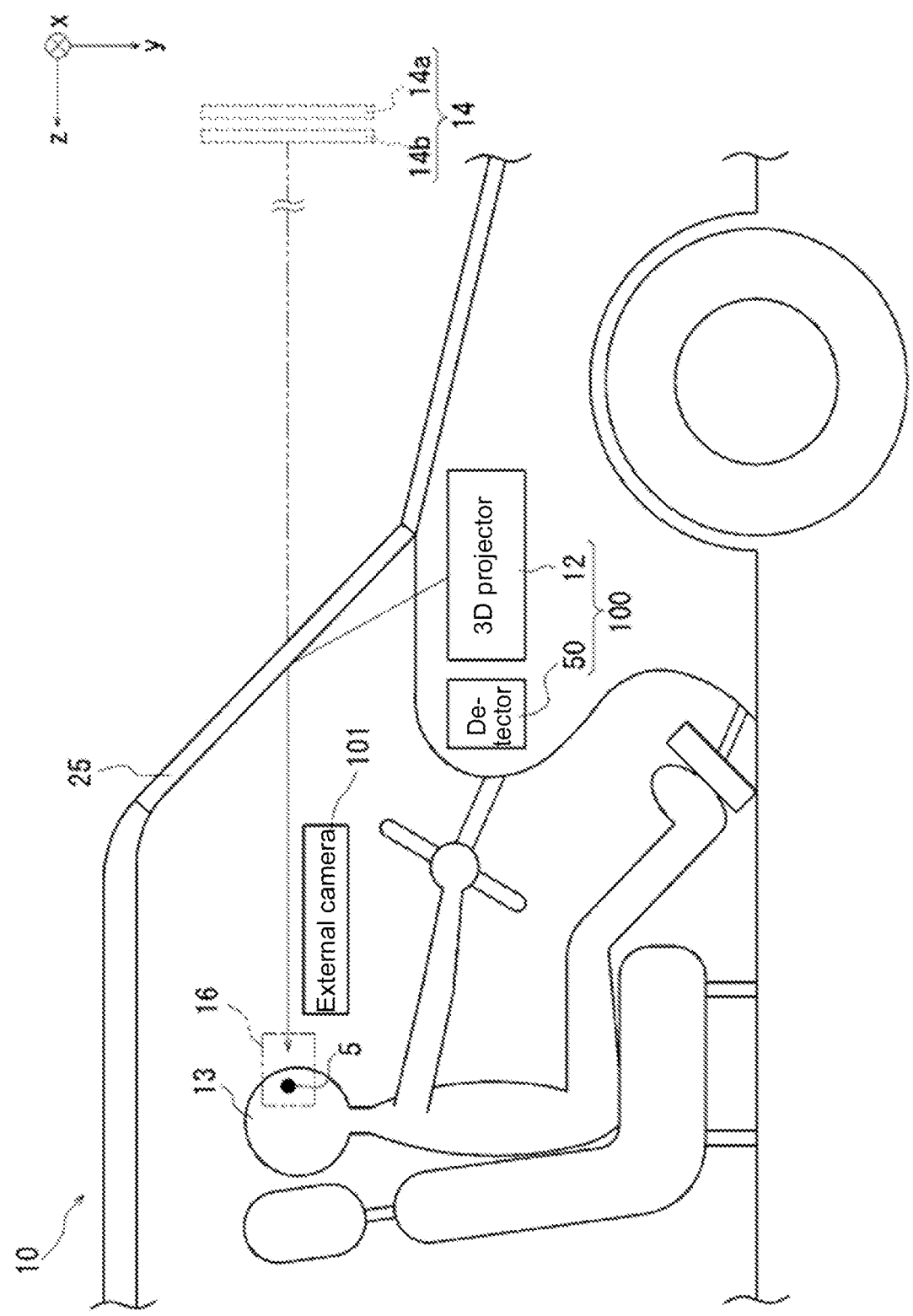
FIG. 1 is a schematic diagram of an example movable body incorporating a 3D image display system.

A 3D image display system 100 implements a setting method according to one embodiment of the present disclosure. FIG. 1 is a schematic diagram of an example movable body incorporating the 3D image display system. As illustrated in FIG. 1, the 3D image display system 100 may be mounted on a movable body 10. The 3D image display system 100 may include, for example, a detector 50 and a 3D projector 12. The 3D image display system 100 communicates with an external camera 101.

Examples of the movable body in the present disclosure include a vehicle, a vessel, and an aircraft. Examples of the vehicle include an automobile, an industrial vehicle, a railroad vehicle, a community vehicle, and a fixed-wing aircraft traveling on a runway. Examples of the automobile include a passenger vehicle, a truck, a bus, a motorcycle, and a trolley bus. Examples of the industrial vehicle include an industrial vehicle for agriculture and an industrial vehicle for construction. Examples of the industrial vehicle include a forklift and a golf cart. Examples of the industrial vehicle for agriculture include a tractor, a cultivator, a transplanter, a binder, a combine, and a lawn mower. Examples of the industrial vehicle for construction include a bulldozer, a scraper, a power shovel, a crane vehicle, a dump truck, and a road roller. Examples of the vehicle may include human-powered vehicles. The classification of the vehicle is not limited to the above examples. Examples of the automobile include an industrial vehicle travelling on a road. One type of vehicle may fall within multiple classes. Examples of the vessel include a jet ski, a boat, and a tanker. Examples of the aircraft include a fixed-wing aircraft and a rotary-wing aircraft. In the example described below, the movable body 10 is a passenger vehicle. The movable body 10 may be any of the above examples rather than a passenger vehicle.

The detector 50 includes a first camera 11A and a first controller 15. The first camera 11A captures a first image including an area expected to include the face of a user 13 of the 3D image display system 100. In the present embodiment, the user 13 may be, for example, the driver of the movable body 10 that is a passenger vehicle. The area expected to include the face of the driver may be, for example, around an upper portion of the driver's seat. The first camera 11A may be installed in the movable body 10. The first camera 11A may be installed at any position inside or outside the movable body 10.

The first camera 11A may be a visible light camera or an infrared camera. The first camera 11A may function both as a visible light camera and an infrared camera. The first camera 11A may include, for example, a charge-coupled device (CCD) image sensor or a complementary metal-oxide semiconductor (CMOS) image sensor.

The first image captured with the first camera 11A is output to the first controller 15. The first controller 15 detects, based on the first image, the position of at least one of eyes 5 of the user 13 as a first position. The detection result obtained by the detector 50 may be coordinate information indicating the pupil positions of the eyes 5 of the user 13.

The detector 50 may include, for example, a sensor. The sensor may be, for example, an ultrasonic sensor or an optical sensor. The first camera 11A may detect the position of the head of the user 13 with the sensor, and may detect the positions of the eyes 5 of the user 13 based on the position of the head. The first camera 11A may use two or more sensors to detect the positions of the eyes 5 of the user 13 as coordinates defined in a 3D space.

The detector 50 may output coordinate information about the detected pupil positions of the eyes 5 to the 3D projector 12. The 3D projector 12 may control an image to be projected based on the coordinate information. The detector 50 may output information indicating the pupil positions of the eyes 5 to the 3D projector 12 through wired or wireless communication. The wired communication may include, for example, communication using a controller area network (CAN).

The detector 50 may include the first controller 15 that is an external device. The first camera 11A may output a captured image to the external first controller 15. The external first controller 15 may detect the pupil positions of the eyes 5 of the user 13 based on the image output from the first camera 11A. The external first controller 15 may output the coordinate information about the detected pupil positions of the eyes 5 to the 3D projector 12. The 3D projector 12 may control an image to be projected based on the coordinate information. The first camera 11A may output the captured first image to the external first controller 15 through wired or wireless communication. The external first controller 15 may output the coordinate information to the 3D projector 12 through wired or wireless communication. Wired communication may include, for example, communication using a CAN.

The 3D projector 12 may be at any position inside or outside the movable body 10. For example, the 3D projector 12 may be inside the dashboard in the movable body 10. The 3D projector 12 emits image light toward a windshield 25.

The windshield 25 is a reflective plate that reflects image light emitted from the 3D projector 12. The image light reflected from the windshield 25 reaches an eye box 16. The eye box 16 is an area defined in a real space in which the eyes 5 of the user 13 are expected to be located based on, for example, the body shape, posture, and changes in the posture of the user 13. The eye box 16 may have any shape. The eye box 16 may include a two-dimensional (2D) area or a 3D area. The solid arrow in FIG. 1 indicates a path traveled by at least a part of image light emitted from the 3D projector 12 to reach the eye box 16. The path traveled by image light is also referred to as an optical path. The image light emitted from the 3D projector 12 represents a parallax image including a right-eye image and a left-eye image. With the eyes 5 of the user 13 located in the eye box 16 receiving image light of the parallax image, the user 13 can view a virtual image 14. The virtual image 14 is on a path extending frontward from the movable body 10 in alignment with the path from the windshield 25 to the eyes 5 (the straight two-dot-dash line in the figure). The 3D projector 12 can function as a head-up display that allows the user 13 to view the virtual image 14. In FIG. 1, the direction in which the eyes 5 of the user 13 are aligned corresponds to x-direction. The vertical direction corresponds to y-direction. The imaging range of the first camera 11A includes the eye box 16.

Figure 2:
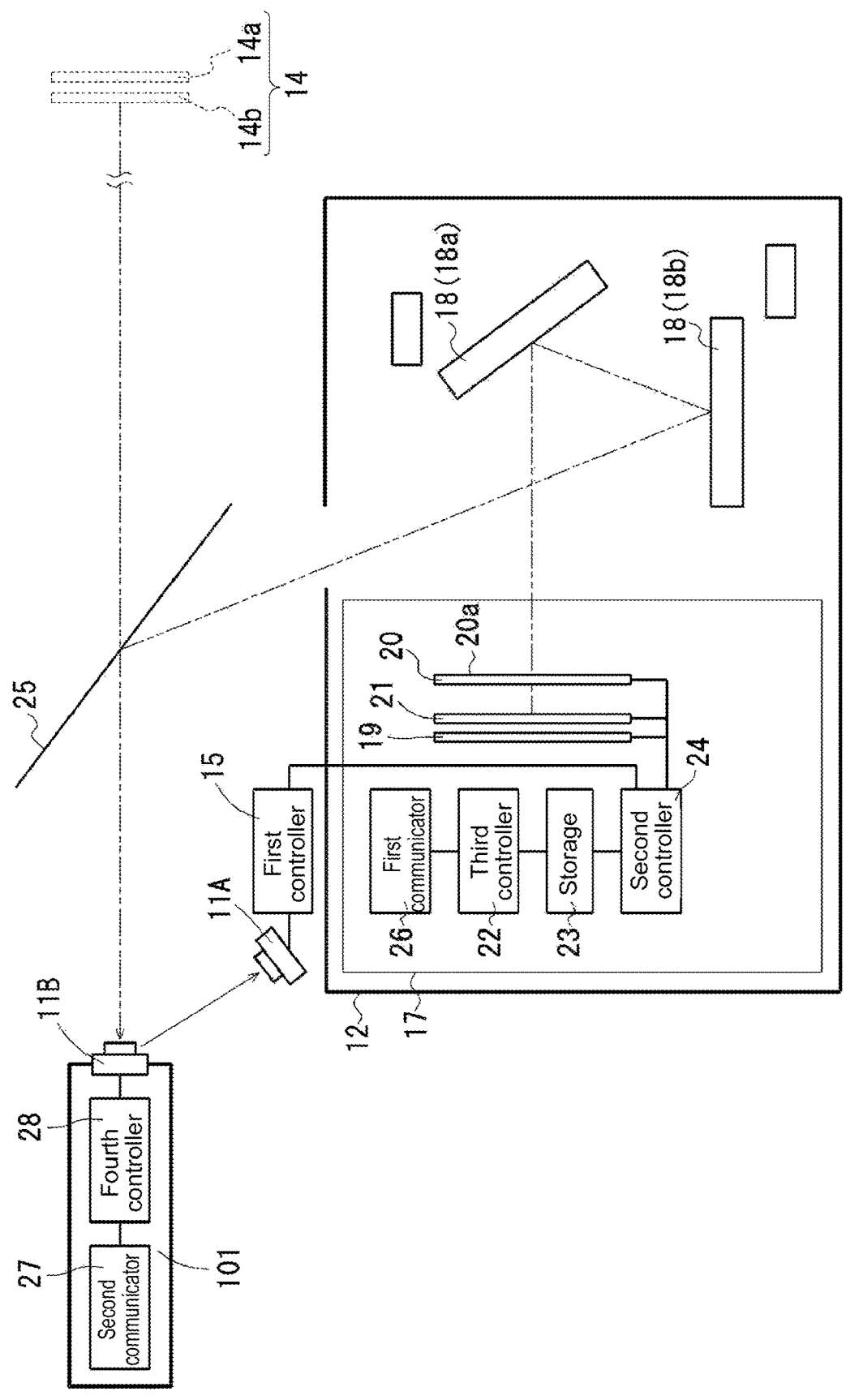
FIG. 2 is a schematic diagram of an example 3D image display system.

As illustrated in FIG. 2, the 3D projector 12 includes a 3D display device 17 and an optical element 18. The 3D display device 17 may include a backlight 19, a display panel 20 including a display surface 20a, a barrier 21, and a second controller 24. The 3D display device 17 may further include a storage 23. The second controller 24 generates a parallax image to appear on the display panel 20.

The optical element 18 may include, for example, a first mirror 18a and a second mirror 18b. At least either the first mirror 18a or the second mirror 18b may have optical power. In the present embodiment, the first mirror 18a is a concave mirror having optical power. The second mirror 18b is a plane mirror. The optical element 18 may function as a magnifying optical system that magnifies a parallax image displayed by the 3D display device 17. The two-dot-dash arrow in FIG. 2 indicates a path traveled by at least a part of image light emitted from the 3D display device 17 to be reflected from the first mirror 18a and the second mirror 18b and then exit the 3D projector 12. The image light emitted from the 3D projector 12 reaches the windshield 25, is reflected from the windshield 25, and then reaches the eyes 5 of the user 13. This allows the user 13 to view the parallax image displayed by the 3D display device 17.

The optical element 18 and the windshield 25 allow image light emitted from the 3D display device 17 to reach the eyes 5 of the user 13. The optical system may control the traveling direction of image light to magnify or reduce an image viewable by the user 13. The optical system may control the traveling direction of image light to deform an image viewable by the user 13 based on a predetermined matrix.

The optical element 18 may have a structure different from the illustrated structure. The mirror may include a concave mirror, a convex mirror, or a plane mirror. The concave mirror or the convex mirror may be at least partially spherical or aspherical. The optical element 18 may be one element or may include three or more elements, in place of two elements. The optical element 18 may include a lens in place of or in addition to a mirror. The lens may be a concave lens or a convex lens. The lens may be at least partially spherical or aspherical.

The backlight 19 is farther from the user 13 than the display panel 20 and the barrier 21 on the optical path of image light. The backlight 19 emits light toward the barrier 21 and the display panel 20. At least a part of light emitted from the backlight 19 travels along the optical path indicated by the dot-dash line and reaches the eyes 5 of the user 13. The backlight 19 may include a light emitter such as a light-emitting diode (LED), an organic EL element, or an inorganic EL element. The backlight 19 may have any structure that allows control of the light intensity and the light intensity distribution.

The display panel 20 may be, for example, a liquid-crystal device such as a liquid-crystal display (LCD). In the present embodiment, the display panel 20 includes a transmissive liquid-crystal display panel. The display panel 20 is not limited to this, and may include any of various display panels.

The display panel 20 includes multiple pixels and changes the light transmittance of light from the backlight 19 incident on each pixel to emit image light that then reaches the eyes 5 of the user 13. The user 13 views an image formed by image light emitted from each pixel in the display panel 20.

The barrier 21 is an optical panel that defines the traveling direction of incident light. As illustrated in the example in FIG. 2, with the barrier 21 being nearer the backlight 19 than the display panel 20, light emitted from the backlight 19 enters the barrier 21 and then enters the display panel 20. In this case, the barrier 21 blocks or attenuates a part of light emitted from the backlight 19 and transmits another part of the light to the display panel 20. The display panel 20 emits incident light traveling in the direction defined by the barrier 21 as image light traveling in the same direction. With the display panel 20 being nearer the backlight 19 than the barrier 21, light emitted from the backlight 19 enters the display panel 20 and then enters the barrier 21. In this case, the barrier 21 blocks or attenuates a part of image light from the display panel 20 and transmits another part of the image light to the eyes 5 of the user 13.

Irrespective of whether the display panel 20 or the barrier 21 is nearer the user 13, the barrier 21 can control the traveling direction of image light. The barrier 21 allows a part of image light from the display panel 20 to reach one of a left eye 5L and a right eye 5R (refer to FIGS. 4A to 4C) of the user 13, and another part of the image light to reach the other of the left eye 5L and the right eye 5R of the user 13. In other words, the barrier 21 directs at least a part of image light toward the left eye 5L of the user 13 and toward the right eye 5R of the user 13. The left eye 5L is also referred to as a first eye, and the right eye 5R as a second eye. In the present embodiment, the barrier 21 is located between the backlight 19 and the display panel 20. In other words, light emitted from the backlight 19 first enters the barrier 21 and then enters the display panel 20.

The barrier 21 defines the traveling direction of image light to allow each of the left eye 5L and the right eye 5R of the user 13 to receive different image light. Each of the left eye 5L and the right eye 5R of the user 13 can thus view a different image. This allows the eyes 5 of the user 13 to view a first virtual image 14a located farther in the negative z-direction than the windshield 25. The first virtual image 14a corresponds to the image appearing on the display surface 20a. The barrier 21 form a second virtual image 14b in front of the windshield 25 and nearer the windshield 25 than the first virtual image 14a. As illustrated in FIG. 2, the user 13 can view an image with the display panel 20 to be at an apparent position that is the position of the first virtual image 14a and with the barrier 21 to be at an apparent position that is the position of the second virtual image 14b.

Figure 3:
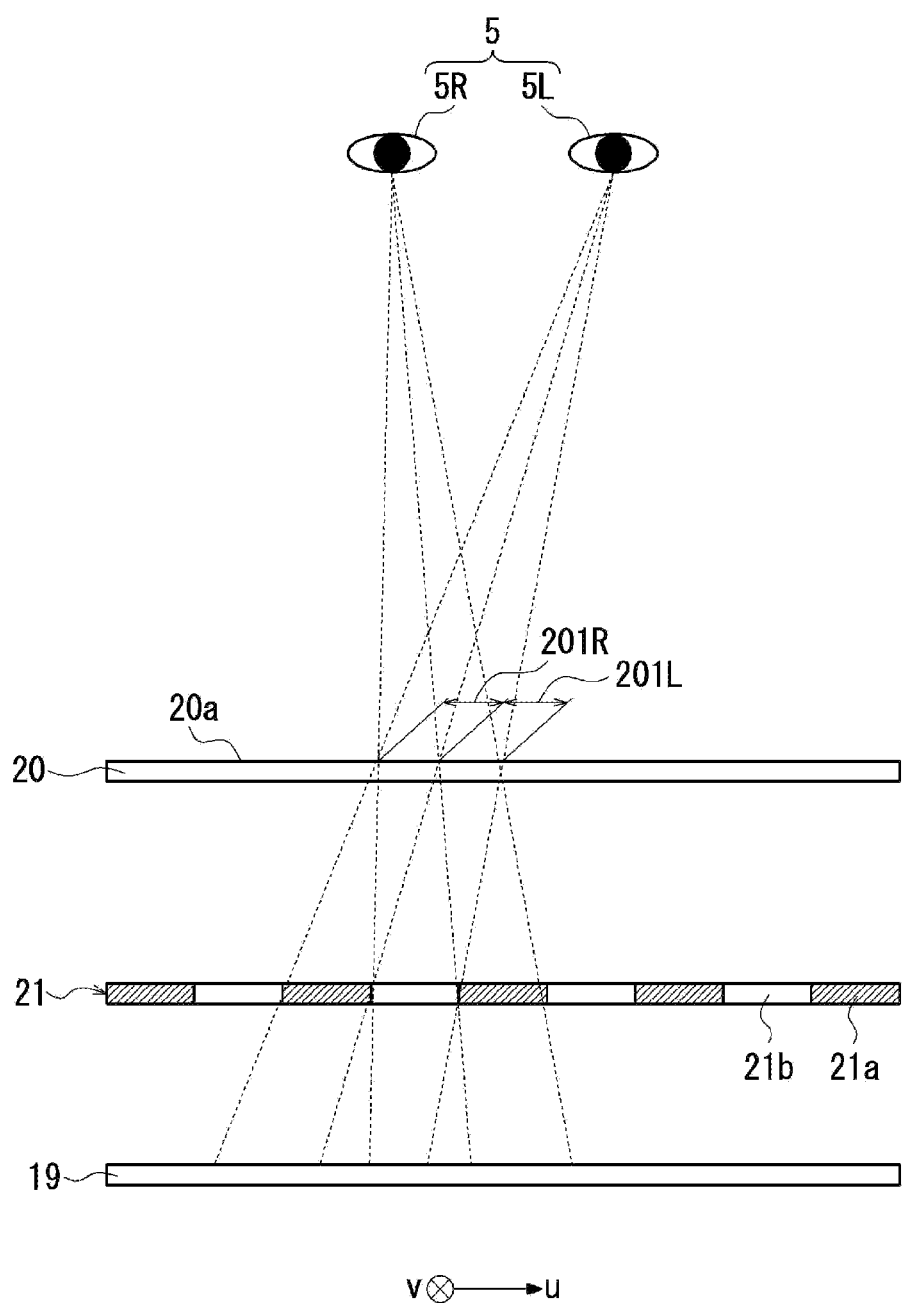
FIG. 3 is a schematic diagram describing the relationship between the eyes of a driver, a display panel, and a barrier.

As illustrated in FIG. 3, the display panel 20 includes left-eye viewing areas 201L viewable with the left eye 5L of the user 13 and right-eye viewing areas 201R viewable with the right eye 5R of the user 13 on the display surface 20a. The display panel 20 displays a parallax image including left-eye images viewable with the left eye 5L of the user 13 and right-eye images viewable with the right eye 5R of the user 13. A parallax image refers to an image projected toward the left eye 5L and the right eye 5R of the user 13 to generate parallax between the two eyes of the user 13. The display panel 20 displays left-eye images on the left-eye viewing areas 201L and right-eye images on the right-eye viewing areas 201R. In other words, the display panel 20 displays a parallax image on the left-eye viewing areas 201L and the right-eye viewing areas 201R. The left-eye viewing areas 201L and the right-eye viewing areas 201R are arranged in u-direction indicating a parallax direction. The left-eye viewing areas 201L and the right-eye viewing areas 201R may extend in v-direction orthogonal to the parallax direction, or in a direction inclined with respect to v-direction at a predetermined angle. In other words, the left-eye viewing areas 201L and the right-eye viewing areas 201R may be arranged alternately in a predetermined direction including a component in the parallax direction. The pitch between the alternately arranged left-eye viewing areas 201L and right-eye viewing areas 201R is also referred to as a parallax image pitch. The left-eye viewing areas 201L and the right-eye viewing areas 201R may be spaced from each other or adjacent to each other. The display panel 20 may further include a display area to display a planar image on the display surface 20a. The planar image generates no parallax between the eyes 5 of the user 13 and is not viewed stereoscopically.

FIG. 4A is a schematic front view of the display panel. As illustrated in FIG. 4A, the display panel 20 includes multiple subpixels arranged in a grid in the horizontal and vertical directions. Each subpixel has one of the colors, red (R), green (G), or blue (B). One pixel may be a set of three subpixels with R, G, and B. For example, multiple subpixels included in one pixel are arranged in the horizontal direction. For example, subpixels having the same color are arranged in the vertical direction. A subpixel group includes multiple subpixels. The subpixel groups are repeatedly arranged in the horizontal direction. The subpixel groups are repeatedly arranged in the vertical direction at positions shifted by one subpixel in the horizontal direction from the corresponding subpixels. In the present embodiment, each subpixel group includes eight subpixels. Each subpixel is assigned with an identification number of, for example, 0 to 7.

Figure 4C:
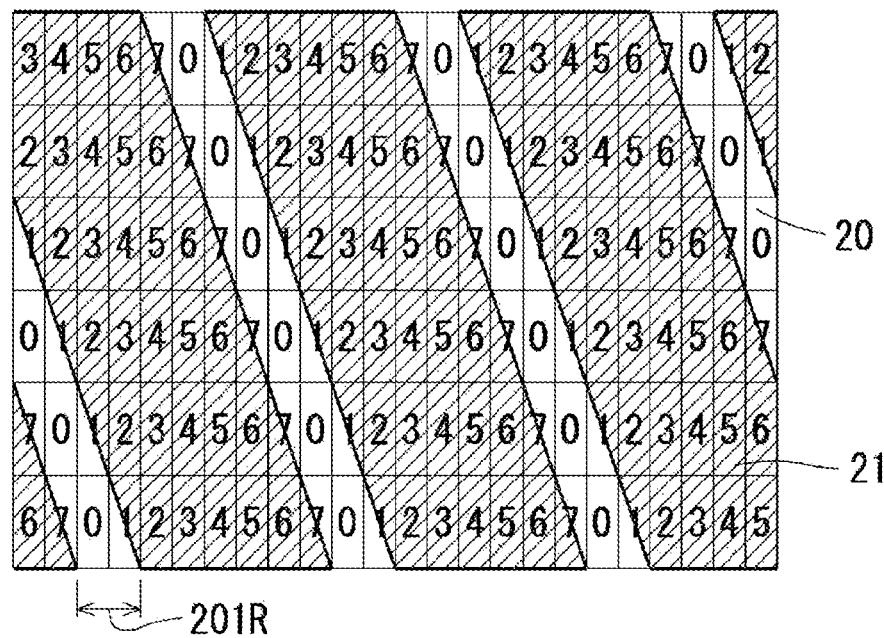
FIG. 4C is a diagram of right-eye viewing areas.

FIG. 4B illustrates the left-eye viewing areas 201L. FIG. 4C illustrates the right-eye viewing areas 201R. Each left-eye viewing area 201L includes subpixels numbered 4 in the center of the area and the halves of subpixels numbered 3 and 5. Two subpixels are thus viewable in each left-eye viewing area 201L. Each right-eye viewing area 201R includes subpixels numbered 0 in the center of the area and the halves of subpixels numbered 7 and 1. Two subpixels are thus viewable in each right-eye viewing area 201R. The left-eye viewing areas 201L and the right-eye viewing areas 201R with subpixels located in this manner allow the user 13 to view a 3D image properly.

Figure 5A:
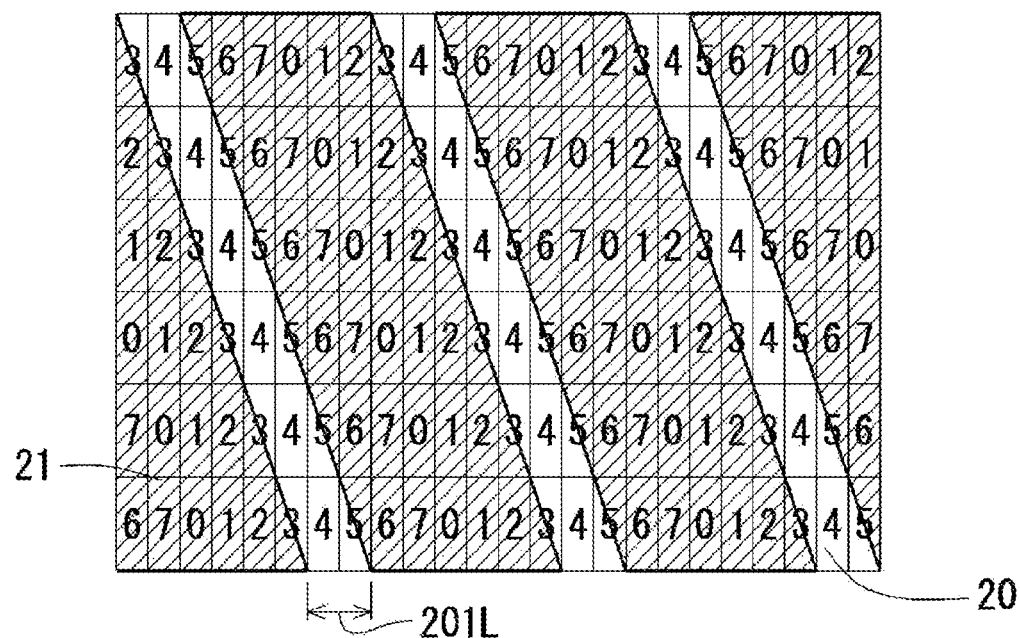
FIG. 5A is a diagram of example left-eye viewing areas.
Figure 5B:
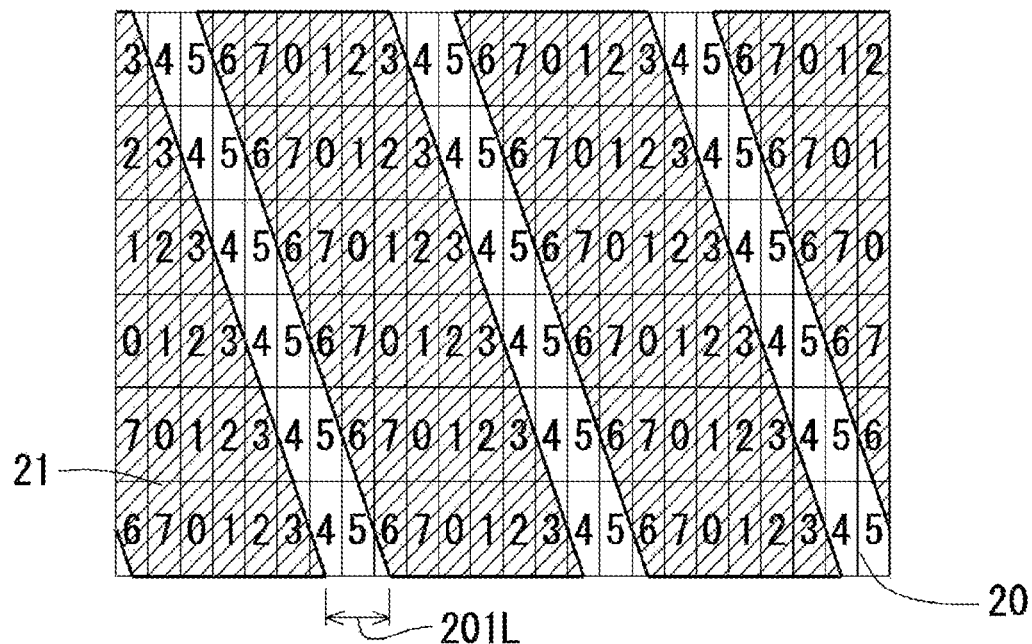
FIG. 5B is a diagram of left-eye viewing areas with deviating viewable subpixels.
Figure 6A:
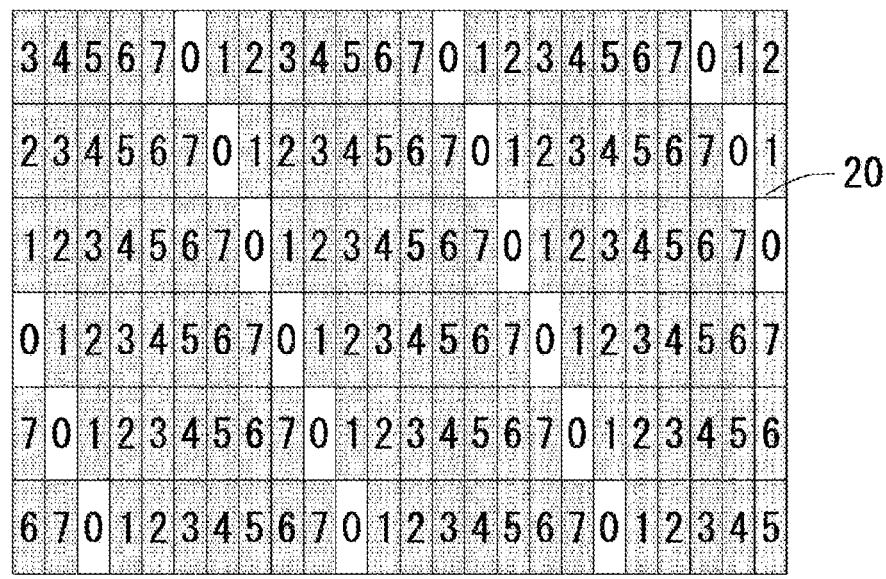
FIG. 6A is a diagram of an example test image.
Figure 6B:
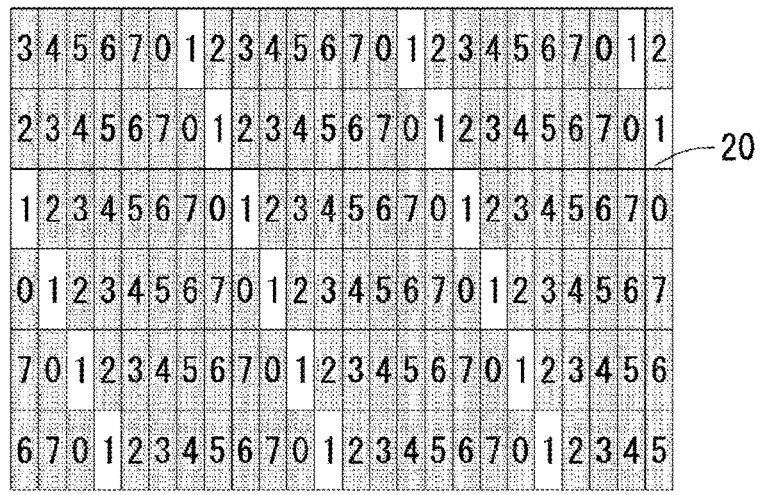
FIG. 6B is a diagram of an example test image.
Figure 6C:
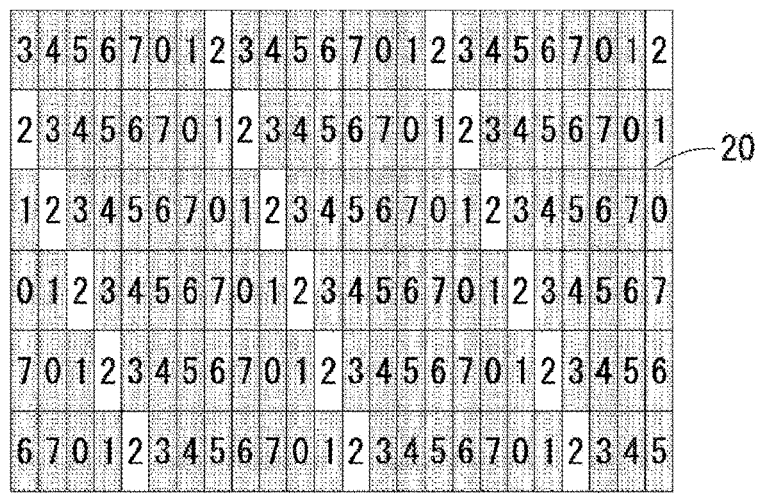
FIG. 6C is a diagram of an example test image.
Figure 6D:
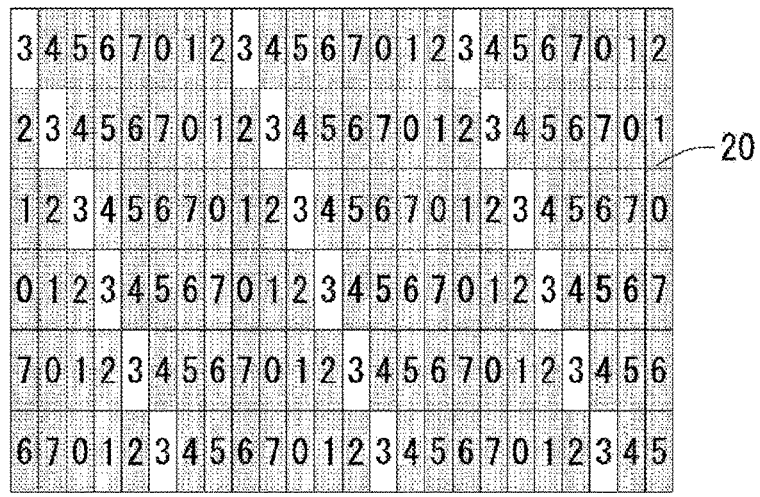
FIG. 6D is a diagram of an example test image.
Figure 6E:
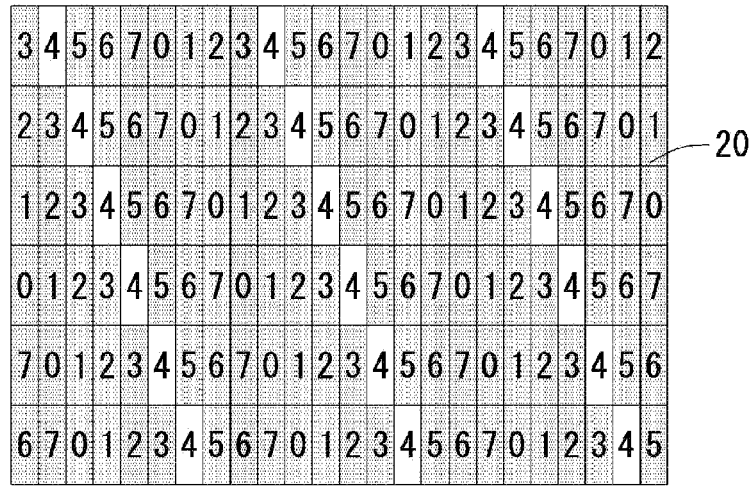
FIG. 6E is a diagram of an example test image.
Figure 6F:
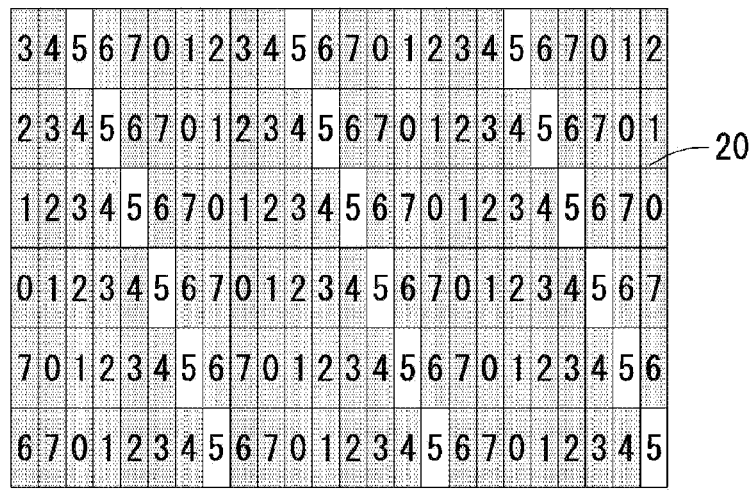
FIG. 6F is a diagram of an example test image.
Figure 6G:
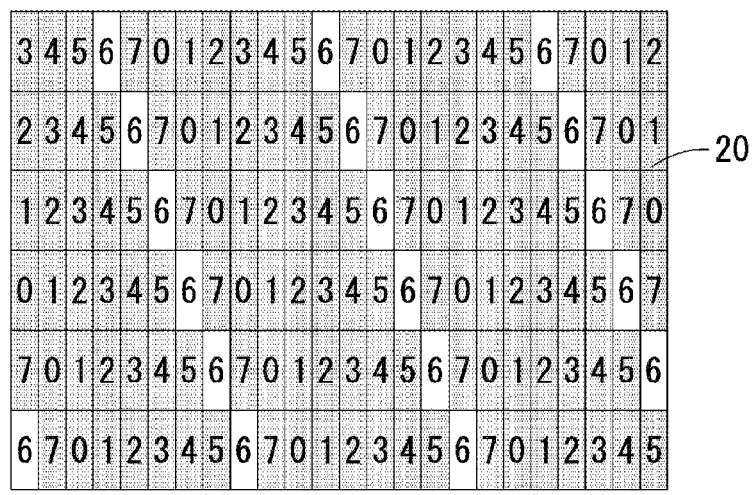
FIG. 6G is a diagram of an example test image.
Figure 6H:
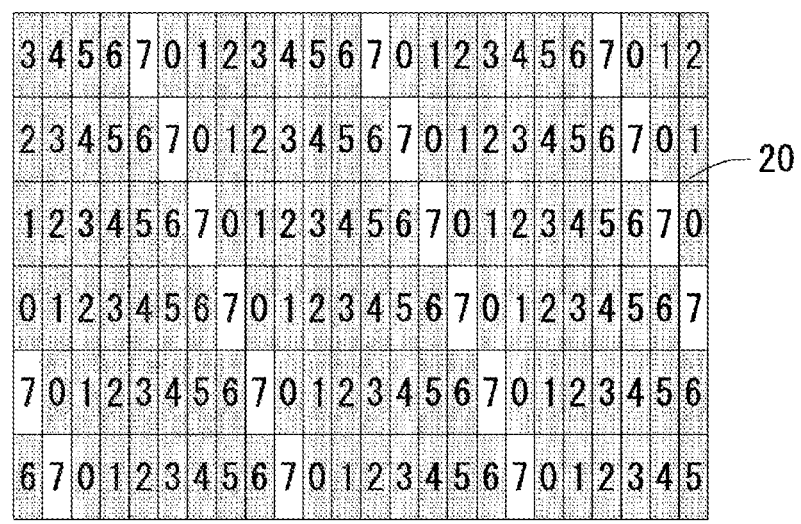
FIG. 6H is a diagram of an example test image.

FIG. 5A is a schematic diagram of example left-eye viewing areas. For example, when neither a deviation nor distortion occurs in the relative positions of the display panel 20 and the barrier 21, or in the relative positions of the display panel 20, the optical element 18, and the windshield 25, as illustrated in FIG. 5A, each left-eye viewing area 201L includes subpixels numbered 4 in the center of the area and the halves of subpixels numbered 3 and 5. However, positional deviations in the manufacturing processes and positional deviations or distortion over time (hereafter referred to as deviations including manufacturing deviations and distortion) are unavoidable and may cause viewable subpixels in the left-eye viewing areas 201L to deviate as illustrated in FIG. 5B. Such a positional deviation may prevent the user 13 from properly viewing the 3D image. Thus, for example, the parallax image to appear on the display panel 20 may be corrected based on the deviation. Thus, deviations including manufacturing deviations and distortion are to be measured with a high-precision measurement device. Although the left-eye viewing areas 201L are described in the above example, the same applies to the right-eye viewing areas 201R.

In the present embodiment, the 3D image display system 100 communicates with the external camera 101. The external camera 101 is a device external to the 3D image display system 100. The 3D display device 17 in the 3D image display system 100 may include, for example, a first communicator 26 that can communicate with an external device and a third controller 22. The first communicator 26 may include an interface that can communicate with an external device. The first communicator 26 may obtain various sets of information from the external device such as the external camera 101 and output the information to the second controller 24. The interface that can perform communication in the present disclosure may include, for example, a physical connector and a wireless communication device. The physical connector may include an electric connector for transmission with electric signals, an optical connector for transmission with optical signals, and an electromagnetic connector for transmission with electromagnetic waves. The electric connector may include a connector complying with IEC 60603, a connector complying with the USB standard, or a connector used for an RCA terminal. The electric connector may include a connector used for an S terminal specified by EIAJ CP-121aA or a connector used for a D terminal specified by EIAJ RC-5237. The electric connector may include a connector complying with the HDMI (registered trademark) standard or a connector used for a coaxial cable including a British Naval Connector, also known as, for example, a Baby-series N Connector (BNC). The optical connector may include a connector complying with IEC 61754. The wireless communication device may include a wireless communication device complying with the Bluetooth (registered trademark) standard and a wireless communication device complying with other standards including IEEE 8021a. The wireless communication device includes at least one antenna.

The external camera 101 includes a second camera 11B, a second communicator 27, and a fourth controller 28. The external camera 101 may be operable by the user 13 and may be, for example, a general-purpose device, such as a digital still camera with communication capabilities, a smartphone, or a tablet device. The second camera 11B captures a second image. The second camera 11B captures images expected to be viewed by the user 13 for allowing the user 13 to check the images. The second camera 11B may capture a second image after, for example, the user 13 moves the external camera 101 to a position to allow the parallax image reflected from the windshield 25 to be captured. For example, the user 13 on the driver's seat may hold the external camera 101 and capture an image with the second camera 11B. The second camera 11B may be located in the eye box 16. The second camera 11B may be located at any position, other than in the eye box 16, to allow an image reflected from the windshield 25 to be captured.

The second communicator 27 communicates directly or indirectly with the first communicator 26. The second communicator 27 may communicate, for example, in accordance with the same telecommunications standards as the first communicator 26. The fourth controller 28 controls the second camera 11B and the second communicator 27, and transmits the second image captured by the second camera 11B to the first communicator 26 through the second communicator 27.

An image reflected from the windshield 25 may be affected by deviations including manufacturing deviations and distortion. The second camera 11B captures and evaluates the affected image to correct the image to appear on the display panel 20 without directly measuring deviations including manufacturing deviations and distortion. The image appearing on the display panel 20 may be, for example, corrected based on a phase distribution.

A phase value and a phase distribution will now be described. A phase value (first parameter) is obtained with, for example, the following procedure. The display panel 20 sequentially displays multiple test images. The second camera 11B sequentially captures the test images reflected from the windshield 25. FIGS. 6A to 6H each illustrate an example test image. For example, the test images appear in eight patterns, or patterns 0 to 7. The test image in the pattern 0 appears when the display panel 20 includes the subpixels numbered 0 turned on and the subpixels numbered 1 to 7 turned off. The test image in the pattern 1 appears when the display panel 20 includes the subpixels numbered 1 turned on and the subpixels numbered 0 and 2 to 7 turned off. The test images in patterns 2 to 7 appear in the same or similar manner. The second camera 11B sequentially captures these test images to obtain eight different second images. The luminance of the second image obtained by capturing the test image in each of the patterns 0 to 7 is extracted and associated with the test image in the corresponding pattern. The user 13 operates the external camera 101 to allow the second camera 11B to capture test images. The user 13 may operate the external camera 101 every time the test image appearing on the display panel 20 is changed. For example, the display panel 20 displays each test image with its pattern number or outputs a message (e.g., with a display or voice output) indicating the change of the test image to allow the user 13 to notice the timing of the change to operate the external camera 101.

Figure 7A:
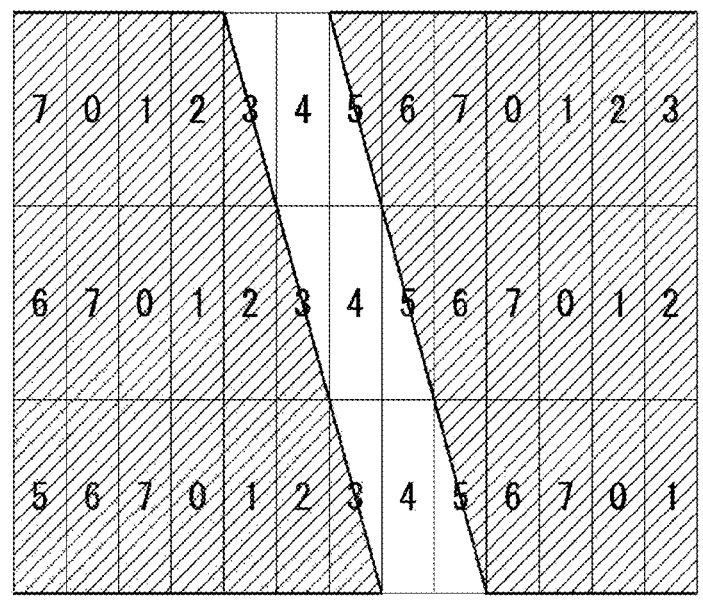
FIG. 7A is a diagram illustrating the positions of subpixels in a left-eye viewing area.
Figure 7B:
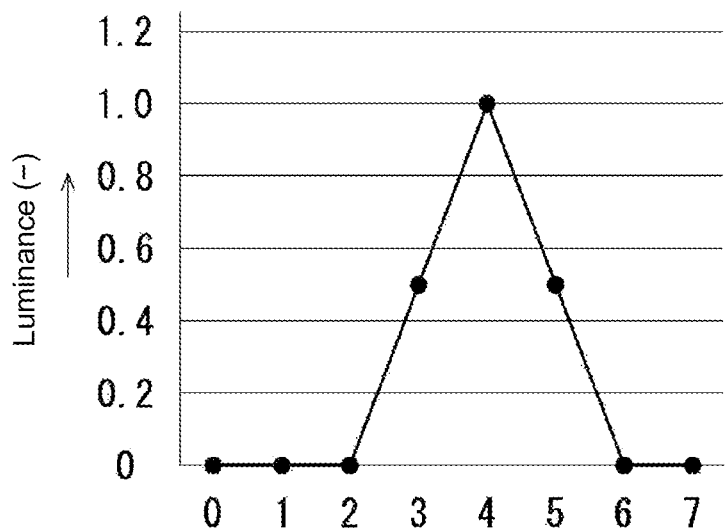
FIG. 7B is a graph showing an example plot indicating luminance.

FIG. 7A is a diagram illustrating the positions of subpixels in the left-eye viewing area. FIG. 7B is a graph showing an example plot indicating luminance. When the subpixels in the left-eye viewing area 201L are located as illustrated in FIG. 7A, the relationship between the test image in each pattern and the luminance of the second image is plotted as in, for example, FIG. 7B. The subpixels numbered 4 are located in the center of the left-eye viewing area 201L. The maximum luminance is thus extracted from the second image obtained by capturing the test image in the pattern 4. The halves of the subpixels numbered 3 and 5 are located in the left-eye viewing area 201L. The luminance extracted from the second images obtained by capturing the test images in the patterns 3 and 5 is a half of the luminance from the image in the pattern 4. The other subpixels are located outside the left-eye viewing area 201L and are blocked by the barrier 21. The luminance of the second images obtained by capturing the test images in the patterns 0 to 2, 6, and 7 is thus zero.

Figure 8A:
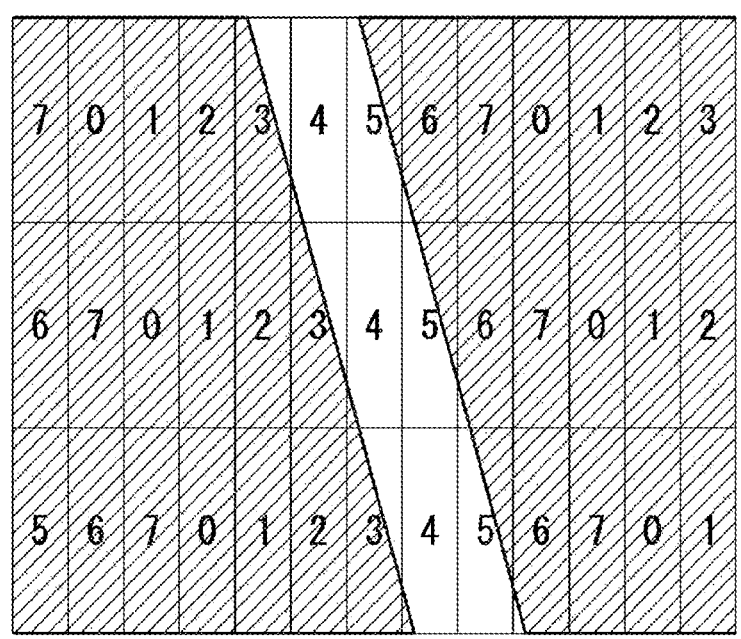
FIG. 8A is a diagram illustrating the positions of subpixels in a left-eye viewing area.
Figures 8B, 9:
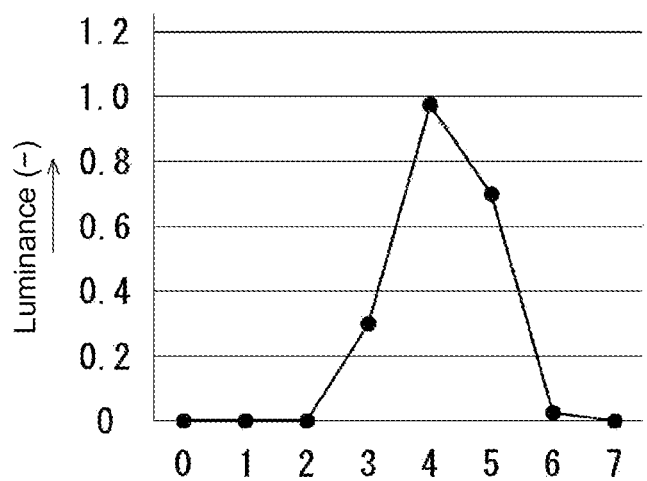
FIG. 8B is a graph showing another example plot indicating luminance.
FIG. 9 is a diagram of an example phase distribution.

FIG. 8A is a diagram illustrating the positions of subpixels in the left-eye viewing areas. FIG. 8B is a graph showing another example plot indicating luminance. When the subpixels in the left-eye viewing area 201L are located as illustrated in FIG. 8A due to deviations including manufacturing deviations and distortion, the relationship between the test image in each pattern and the luminance of the second image is plotted as in, for example, FIG. 8B. The subpixels numbered 4 deviate from the center of the left-eye viewing area 201L. About 70% of the subpixels numbered 5 are located in the left-eye viewing area 201L. About 30% of the subpixels numbered 3 are located in the left-eye viewing area 201L. Although the maximum luminance is extracted from the second image obtained by capturing the test image in the pattern 4, as in the example in FIG. 7B, the luminance extracted from the second image obtained by capturing the test image in the pattern 3 is about 30% of the luminance from the image in the pattern 4. The luminance extracted from the second image obtained by capturing the test image in the pattern 5 is about 70% of the luminance from the image in the pattern 4. The luminance plot in FIG. 8B differs from the luminance plot in FIG. 7B. The second camera 11B captures multiple test images with the fixed gain and exposure time to obtain the luminance plots.

In the present embodiment, a phase value is a parameter indicating the positional deviation of subpixels in the left-eye viewing area 201L (or right-eye viewing area 201R). When the subpixels are located as illustrated in, for example, FIG. 7A, the phase value is 4 without any deviation. FIG. 7B illustrates a luminance plot with a phase value of 4. Deviations including manufacturing deviations and distortion may cause the positions of the subpixels in the left-eye viewing area 201L (right-eye viewing area 201R) to deviate. When the subpixels are located as illustrated in, for example, FIG. 8A, the phase value is 4.7. FIG. 8B illustrates a luminance plot with a phase value of 4.7. The relationship between the phase value and the luminance plot may be predetermined based on, for example, experiments.

Multiple second images obtained by capturing the test images are transmitted from the second communicator 27 in the external camera 101 to the first communicator 26 in the 3D image display system 100. The third controller 22 creates luminance plots with the above procedure based on the received second images. The third controller 22 calculates phase values based on the created luminance plots.

The third controller 22 calculates a phase value for each of all the subpixels on the display panel 20 and obtains the calculation results as a phase distribution. The parallax image to appear on the display panel 20 may be corrected based on the obtained phase distribution. As in the example of the phase distribution illustrated in FIG. 9, the third controller 22 may also divide the display surface 20a into multiple sections and calculate a representative value (phase value) for each section to obtain a distribution of representative values. In the example in the figure, the display surface 20a may be divided into 35 sections in 5 rows and 7 columns, and a representative phase value may be calculated for each section. Each representative value may be, for example, the phase value at the center of the section, or may be the phase value at a predetermined position other than the center. The coordinates indicating each representative value may be determined before the second camera 11B captures test images. For example, the subpixels at positions to be used for luminance extraction for representative value calculation are turned on. The coordinates of the positions of the on-state subpixels are then used as the coordinates indicating the representative value before the second camera 11B captures test images. After the second camera 11B captures the test images, the third controller 22 extracts the luminance at the coordinates indicating the representative value and creates luminance plots to calculate representative phase values.

The third controller 22 may store, for example, the calculated phase distribution into the storage 23. The second controller 24 can correct a parallax image to appear on the display panel 20 by referring to the phase distribution stored in the storage 23. When obtaining the distribution of the representative values, the second controller 24 can obtain the phase distribution covering all subpixels in the display panel 20 by applying the representative value of each section to the phase values of all subpixels in the section. As described above, deviations including manufacturing deviations and distortion may occur over time during the use of the movable body 10. Thus, the phase distribution stored in the storage 23 may be updated periodically. For example, the phase distribution may be updated during periodic vehicle inspections at maintenance workshops.

Figure 10:
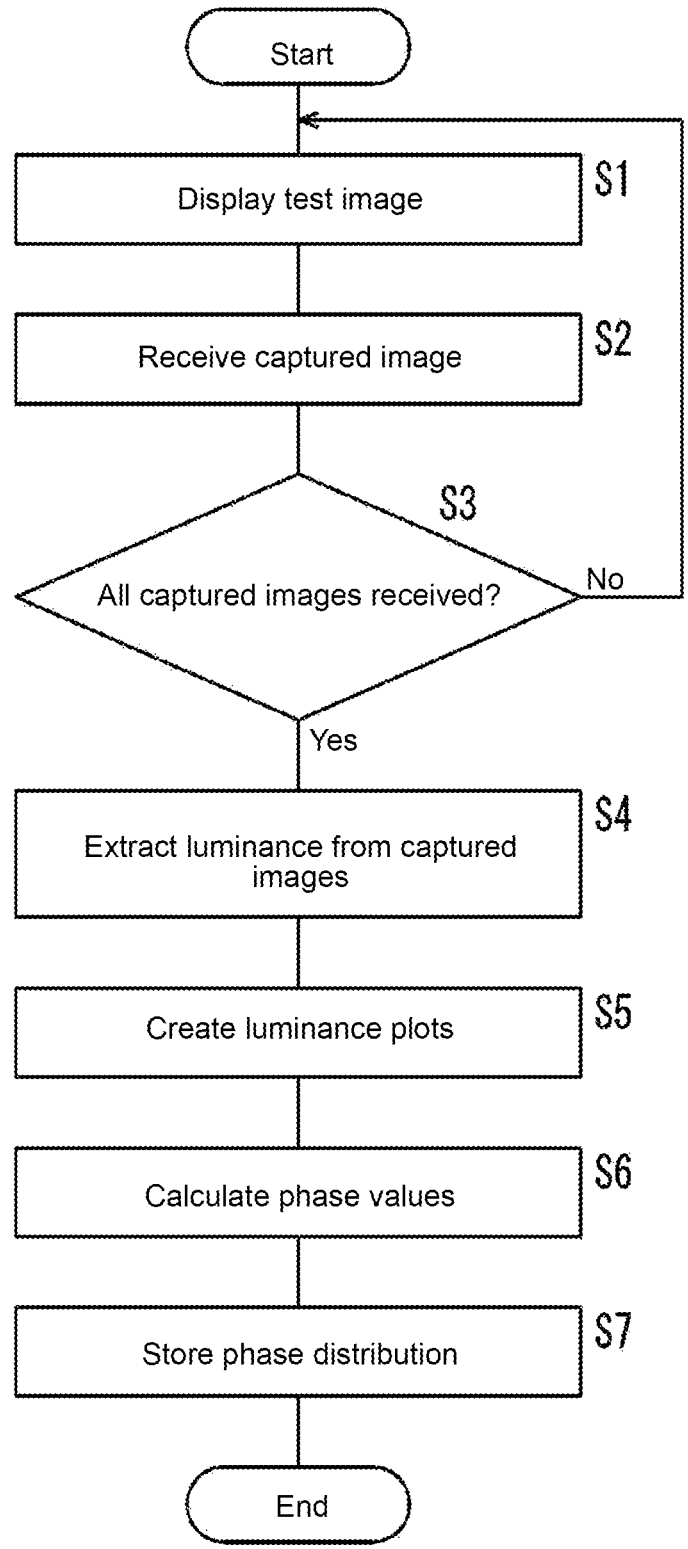
FIG. 10 is a flowchart of a setting process performed by the 3D image display system.

FIG. 10 is a flowchart of a setting process performed by the 3D image display system. Before the process starts, the user 13 moves the external camera 101 to a position to allow the parallax image reflected from the windshield 25 to be captured. For example, the user 13 on the driver's seat may hold the external camera 101 in front of the eyes 5 and operate the external camera 101. Once the setting process starts, the second controller 24 first causes the display panel 20 to display a test image in step S1. The test image is, for example, in the pattern 0. The user 13 operates the external camera 101 to capture the test image in the pattern 0 with the second camera 11B. The captured second image is transmitted from the external camera 101 to the 3D image display system 100. When the second image is received in step S2, the determination is performed in step S3 as to whether the second images in all the patterns are received. When the second images in all the patterns are received, the processing advances to step S4. When any second image in one or more patterns is yet to be received, the processing returns to step S1. At the time when the test image appears in the pattern 0, some second images are yet to be received. The test image in the subsequent pattern 1 thus appears in step S1. The test images appear sequentially in this manner and are sequentially captured by the second camera 11B. The second images transmitted from the external camera 101 are received by the 3D image display system 100. After the second images in all the patterns up to pattern 7 are received, the processing advances to step S4 to extract the luminance from the second images. In step S5, luminance plots are created based on the extracted luminance. In step S6, the third controller 22 calculates phase values based on the created luminance plots. The relationships between the luminance plots and the phase values may be prestored in, for example, the storage 23. The third controller 22 may compare the created luminance plots with the luminance plots stored in the storage 23 and calculate phase values by, for example, pattern matching. In step S7, the third controller 22 stores the calculated phase values with the corresponding coordinates on the display panel 20 into the storage 23 as a phase distribution (second distribution). The third controller 22 updates a phase distribution (first distribution) stored in the storage 23 to the new phase distribution. The phase distribution (first distribution) stored in the storage 23 before the update is the phase distribution updated in the previous setting process. When no previous setting process is performed, the phase distribution (first distribution) stored in the storage 23 before the update is the phase distribution stored as an initial value.

Although the second image is transmitted to the 3D image display system 100 every time the second camera 11B captures a test image in the flowchart in FIG. 10, the external camera 101 may transmit all the second images to the 3D image display system 100 at once after all the test images are captured.

As described above, the second controller 24 can correct a parallax image to appear on the display panel 20 by referring to the phase distribution stored in the storage 23. The phase distribution is the distribution with the eyes 5 of the user 13 at reference positions (at an optimum viewing distance). The phase distribution varies when the eyes 5 of the user 13 moves from the reference positions. The second controller 24 refers to the phase distribution stored in the storage 23 and increases or decreases the phase values from the referenced phase distribution based on the distance between the positions of the eyes 5 of the user 13 (first position) detected by the detector 50 and the reference positions. The second controller 24 may correct the parallax image to appear on the display panel 20 based on the phase values that have been increased or decreased.

Second images captured by the second camera 11B correspond to images viewable with the eyes 5 of the user 13. The position of the second camera 11B corresponds to the positions of the eyes 5 of the user 13. The phase values calculated based on the second images obtained by capturing the test images and the phase distribution are obtained when the eyes 5 of the user 13 are at the position of the second camera 11B. In the 3D image display system 100, the parallax image to appear on the display panel 20 changes in response to a change in the positions of the eyes 5 of the user 13. When the positions of eyes 5 of the user 13 change and the phase distribution is unchanged, the parallax image based on the phase distribution may be corrected insufficiently depending on the positions of eyes 5 of the user 13. This may prevent the user 13 from viewing the 3D image properly. The external camera 101 is operable by the user 13. The second camera 11B may thus not be fixed at the positions of the eyes 5. Thus, the 3D image display system 100 detects the position of the second camera 11B (external camera 101) when the test images are captured and associates the position of the second camera 11B with the phase distribution. An image of the second camera 11B can be captured by the first camera 11A. When the test image appears on the display panel 20 to be captured by the second camera 11B, the first controller 15 detects the position of the second camera 11B as a second position based on the first image captured by the first camera 11A. The third controller 22 may calculate phase values based on the detected second position and obtain a phase distribution.

Another embodiment will now be described. In the above embodiment, the user 13 notices the timing of the change of a test image and operates the external camera 101 to capture test images with the external camera 101. The user 13 with such an operational load may obtain an inappropriate phase distribution with any erroneous operation. The external camera 101 may detect the timing of the change of the test image. For a test image on the display panel 20 to be changed to the next test image, for example, the 3D image display system 100 may notify the external camera 101 after the test image is changed to the next test image. For example, the first communicator 26 in the 3D image display system 100 transmits information indicating that the test image has been changed. When the second communicator 27 in the external camera 101 receives the information, the fourth controller 28 detects the change of the test image being displayed. The second camera 11B then captures a test image after the change. The second communicator 27 transmits the second image obtained by capturing the test image with the second camera 11B to the 3D image display system 100. Upon receiving the second image from the external camera 101, the 3D image display system 100 associates the currently appearing test image with the received second image, and then displays the next test image.

For a test image on the display panel 20 to be changed to the next test image, the test image appears with, for example, a symbol or a figure indicating the change. The fourth controller 28 detects the change of the test image by detecting the symbol or the figure in the second image captured by the second camera 11B. The second communicator 27 transmits the second image obtained by capturing the test image after the change to the 3D image display system 100. Upon receiving the second image from the external camera 101, the 3D image display system 100 associates the currently appearing test image with the received second image, and then displays the next test image.

In the above embodiments, the external camera 101 transmits second images captured by the second camera 11B to the 3D image display system 100. This structure involves transmission of a large amount of data, which takes time. When detecting the change of the test image being displayed, the fourth controller 28 extracts first information from the second image obtained by capturing the test image after the change. The second communicator 27 then transmits the first information. The first information has a smaller amount of data than the second image. The first information may indicate luminance extracted from the second image. The 3D image display system 100 receives the first information from the external camera 101 in place of second images. The third controller 22 calculates the phase distribution based on the received first information.

Although the setting method in the above embodiments includes updating the phase distribution using the second camera 11B, a setting method in another embodiment may include, for example, updating distortion correction information. The distortion correction information is used to correct any distorted shape of the virtual image 14 based on the positions of the eyes of the user 13. The distortion correction information may include information to deform the image to appear on the display panel 20 to reduce the distortion of the shape of the virtual image 14. For example, the distortion correction information may include information indicating the shift amount of each of multiple feature points in the image appearing on the display panel 20. The multiple feature points in the image may be arranged in any other manner. For example, the feature points may be arranged in a grid at any distance from each other. The multiple feature points may correspond to multiple pixels that display images. The correction using the distortion correction information deforms the image appearing on the display panel 20 to, for example, include each of the multiple feature points shifted by a shift amount indicated by the distortion correction information. For example, the correction using the distortion correction information may deform the image to appear on the display panel 20 uniformly or nonuniformly before the image appears on the display panel 20. The user 13 can view the virtual image 14 with a smaller distortion with light projected from the image deformed based on the distortion correction information.

Figure 11A:
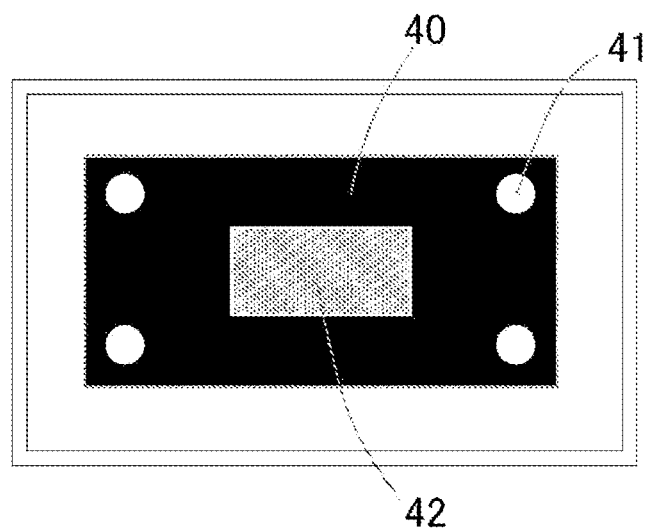
FIG. 11A is a schematic diagram describing a method for setting distortion correction information.
Figure 11B:
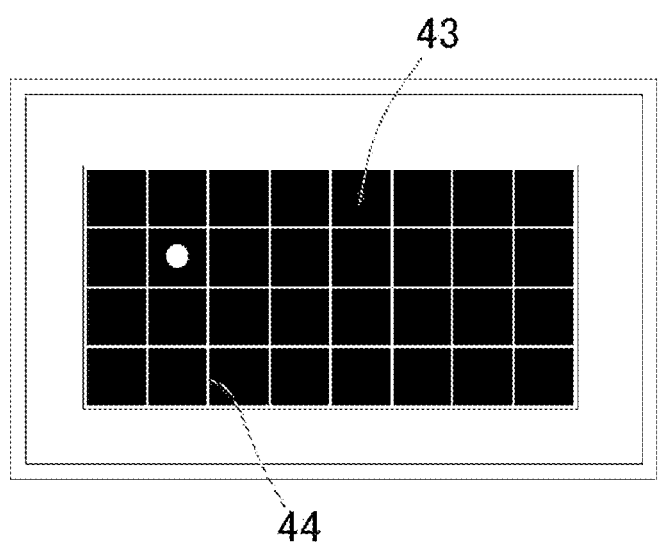
FIG. 11B is a schematic diagram describing a method for setting distortion correction information.

FIGS. 11A and 11B are schematic diagrams each describing a method for setting the distortion correction information. For example, a white plate is placed in advance at a position at which the virtual image 14 is viewable or at a predetermined distance frontward from the windshield 25. For the user 13 seated on the driver's seat, a first test image appears on the display panel 20. The user 13 operates the external camera 101 to capture the first test image with the second camera 11B. As illustrated in, for example, FIG. 11A, a first test image 40 appears with white circles 41 in the four corners of the image and a monitoring area 42 visually indicating the status of obtaining correction information in the center of the image. The distortion correction information is obtained by changing the capturing position for the second camera 11B within a predetermined range and capturing an image including feature points at each of predetermined positions within the range. The white circles 41 in the four corners appear to determine that the entire first test image 40 is viewable as the virtual image 14. In the external camera 101, the fourth controller 28 detects the second image obtained by capturing the first test image 40 with the second camera 11B including the white circles 41 in the four corners and transmits the detection result to the 3D image display system 100. Upon receiving the detection result, the 3D image display system 100 displays a second test image 43 indicating feature points on the display panel 20. The second test image 43 indicating the feature points may be, for example, a grid image 44, as illustrated in FIG. 11B. The 3D image display system 100 starts detecting the position (second position) of the second camera 11B continuously with the detector 50 after the first test image 40 appears.

Although the user 13 moves the external camera 101 to allow the second camera 11B to capture the second test image 43 at every predetermined position, the user 13 may not recognize the predetermined positions. The user 13 may move the external camera 101, for example, upward, downward, leftward, and rightward in any manner. As described above, the 3D image display system 100 continues to detect the position (second position) of the second camera 11B. Thus, when the second position matches one of the predetermined positions, the second controller 24 causes the display panel 20 to display the second test image 43 indicating the feature points. In the external camera 101, the fourth controller 28 detects the appearing second test image 43, and the second camera 11B then captures the second test image 43, which is transmitted to the 3D image display system 100. Upon receiving the second image from the external camera 101, the 3D image display system 100 associates the received second image with the second position at the time when the second image 43 appears on the display panel 20 to store the second image into the storage 23.

When the second position matches no predetermined position or is a position stored in the storage 23 in a manner associated with the second image, the display panel 20 displays the first test image 40. For the second position stored in the storage 23 in a manner associated with the second image, the position may appear in the monitoring area 42 in the center of the first test image 40 to indicate that the image used to obtain distortion correction information is captured. The user 13 views the monitoring area 42 to visually check whether a second image is captured at the predetermined position. The user 13 can, for example, move the external camera 101 intentionally to place the second camera 11B at a predetermined position at which no second image is captured.

As described above, the 3D image display system 100 switches between displaying the first test image 40 and displaying the second test image 43, and receives the second images captured at all the predetermined positions and transmitted repeatedly by the external camera 101. When the 3D image display system 100 receives the second images at all the predetermined positions, the third controller 22 calculates the distribution (second distribution) of the shift amount (first parameter) based on the coordinates of the predetermined positions and the second images, and stores the distribution into the storage 23. At this time, the third controller 22 updates a shift distribution (first distribution) stored in the storage 23 to the new shift distribution. The shift distribution (first distribution) stored in the storage 23 before the update is the shift distribution updated in the previous setting process. When no previous setting process has been performed, the shift distribution (first distribution) stored in the storage 23 before the update is the shift distribution stored as an initial value.

The 3D image display system 100 can display a distortion-corrected parallax image on the display panel 20 using the shift distribution stored in the storage 23. The user 13 can view the virtual image 14 based on the distortion-corrected parallax image. As described above, the 3D image display system 100 performs the setting process for a shift distribution to correct distortion as well as the setting process for a phase distortion. The user can thus view a 3D image more properly.

The structure according to the present disclosure is not limited to the structure described in the above embodiments, but may be changed or varied variously. For example, the functions of the components are reconfigurable unless any contradiction arises. Multiple components may be combined into a single unit, or a single component may be divided into separate units. For example, the first controller 15, the second controller 24, and the third controller 22 may be separate controllers. In another example, a single controller may function as at least two of the first controller 15, the second controller 24, or the third controller 22. In other words, a single controller may serve as two or more of these controllers. For example, the detector 50 including the first camera 11A and the second camera 11B may include a single controller that functions as the first controller 15 and the third controller 22.

The figures illustrating the configurations according to the present disclosure are schematic. The figures are not drawn to scale relative to the actual size of each component.

In the present disclosure, first, second, or others are identifiers for distinguishing the components. The identifiers of the components distinguished with first, second, and others in the present disclosure are interchangeable. For example, the first eye can be interchangeable with the second eye. The identifiers are to be interchanged together. The components for which the identifiers are interchanged are also to be distinguished from one another. The identifiers may be eliminated. The components without such identifiers can be distinguished with reference numerals. The identifiers such as first and second in the present disclosure alone should not be used to determine the order of components or to suggest the existence of smaller number identifiers.

In the present disclosure, x-axis, y-axis, and z-axis are used for ease of explanation and may be interchangeable with one another. The orthogonal coordinate system including x-axis, y-axis, and z-axis is used to describe the structures according to the present disclosure. The positional relationship between the components in the present disclosure is not limited to being orthogonal.

The present disclosure may be implemented in the following forms.

In one embodiment of the present disclosure, a method is for setting a three-dimensional image display system. The three-dimensional image display system includes a display panel that displays a parallax image including a right-eye image and a left-eye image, an optical panel that defines a traveling direction of light for each of the right-eye image and the left-eye image, a reflective plate that reflects the right-eye image and the left-eye image with the traveling direction of light being defined, a first camera that captures a first image including an image of an area expected to include a face of a user of the three-dimensional image display system, a first controller that detects a position of at least one of eyes of the user as a first position based on the first image, a second controller that generates the parallax image including the right-eye image and the left-eye image based on a first distribution of a first parameter and the first position, a third controller that calculates a second distribution of the first parameter, and a first communicator that communicates with an external device. The external device includes an external camera including a second camera that captures a second image and a second communicator that communicates directly or indirectly with the first communicator. The method includes moving the second camera to a position to allow the parallax image reflected from the reflective plate to be captured, detecting the position of the second camera as a second position based on the first image, sequentially displaying a plurality of test images on the display panel, and sequentially capturing the plurality of test images reflected from the reflective plate with the second camera to obtain a plurality of second images, calculating the second distribution based on the plurality of second images and the second position, and replacing the first distribution with the calculated second distribution.

In one embodiment of the present disclosure, the method for setting a 3D image display system allows the user to properly view a 3D image.

REFERENCE SIGNS 5 eye (5L: left eye, 5R: right eye)
10 movable body
11A first camera
11B second camera
12 3D projector
13 user
14 virtual image (14a: first virtual image, 14b: second virtual image)
15 first controller
16 eye box
17 3D display device
18 optical element (18a: first mirror, 18b: second mirror)
19 backlight
20 display panel (20a: display surface)
201L left-eye viewing area
201R right-eye viewing area
21 barrier
22 third controller
23 storage
24 second controller
25 windshield
28 fourth controller
40 first test image
43 second test image
50 detector
100 3D image display system
101 external camera

The invention claimed is:

1. A method for setting a three-dimensional image display system including a display panel configured to display a parallax image including a right-eye image and a left-eye image, an optical panel configured to define a traveling direction of light for each of the right-eye image and the left-eye image, a reflective plate configured to reflect the right-eye image and the left-eye image with the traveling direction of light being defined, a first camera configured to capture a first image including an image of an area expected to include a face of a user of the three-dimensional image display system, a first controller configured to detect a position of at least one of eyes of the user as a first position based on the first image, a second controller configured to generate the parallax image including the right-eye image and the left-eye image based on a first distribution of a first parameter and the first position, a third controller configured to calculate a second distribution of the first parameter, and a first communicator configured to communicate with an external device, the external device including an external camera including a second camera configured to capture a second image and a second communicator configured to communicate directly or indirectly with the first communicator, the method comprising:

moving the second camera to a position to allow the parallax image reflected from the reflective plate to be captured;

detecting the position of the second camera as a second position based on the first image;

sequentially displaying a plurality of test images on the display panel, and sequentially capturing the plurality of test images reflected from the reflective plate with the second camera to obtain a plurality of second images;

calculating the second distribution based on the plurality of second images and the second position; and replacing the first distribution with the calculated second distribution.

2. The method according to claim 1, wherein
the third controller associates, with a position at which the second image is captured, the second position detected when a test image of the plurality of test images being displayed is changed.

3. The method according to claim 1, wherein
the external camera further includes a fourth controller configured to detect a change of a test image of the plurality of test images being displayed, and
when the fourth controller detects the change of the test image of the plurality of test images being displayed, the second communicator transmits a second image obtained by capturing a test image after the change to the first communicator.

4. The method according to claim 1, wherein
the external camera further includes a fourth controller configured to detect a change of a test image of the plurality of test images being displayed,
when detecting the change of the test image of the plurality of the test images being displayed, the fourth controller extracts first information from a second image obtained by capturing a test image after the change, and the second communicator transmits the first information to the first communicator, and the third controller calculates the second distribution using the first information in place of the second image.

5. The method according to claim 1, wherein the second camera captures the plurality of test images with a fixed gain and a fixed exposure time.

6. The method according to claim 1, wherein the three-dimensional image display system includes a single controller as at least two of the first controller, the second controller, or the third controller.

7. The method according to claim 1, wherein the three-dimensional image display system further includes an optical element configured to perform an optical process on the right-eye image and the left-eye image with the traveling direction of light being defined and to direct the right-eye image and the left-eye image to the reflective plate.

* * * * *